United States Patent
Nwosu

(10) Patent No.: US 7,216,803 B2
(45) Date of Patent: May 15, 2007

(54) BIOMETRIC DELEGATION AND AUTHENTICATION OF FINANCIAL TRANSACTIONS

(76) Inventor: Kingsley Chukwudum Nwosu, 1875 Pilgrim Way, Union, NJ (US) 07083

( * ) Notice: Subject to any disclaimer, the term of this patent is extended or adjusted under 35 U.S.C. 154(b) by 0 days.

(21) Appl. No.: 11/040,224

(22) Filed: Jan. 21, 2005

(65) Prior Publication Data

US 2006/0163344 A1 Jul. 27, 2006

(51) Int. Cl.
*G06K 7/08* (2006.01)
(52) U.S. Cl. .................. 235/380; 235/451; 705/41; 705/44
(58) Field of Classification Search ............... 235/375, 235/380, 382, 451; 705/17, 39, 41, 44
See application file for complete search history.

(56) References Cited

U.S. PATENT DOCUMENTS

| | | | |
|---|---|---|---|
| 5,854,581 A * | 12/1998 | Mori et al. ................. | 235/379 |
| 6,144,848 A * | 11/2000 | Walsh et al. ................ | 455/419 |
| 6,226,744 B1 | 5/2001 | Murphy ....................... | 713/200 |
| 6,394,343 B1 * | 5/2002 | Berg et al. .................. | 235/379 |
| 6,611,819 B1 * | 8/2003 | Oneda ......................... | 705/41 |
| 6,786,403 B2 * | 9/2004 | Lin ............................. | 235/383 |

FOREIGN PATENT DOCUMENTS

| | | |
|---|---|---|
| EP | 0 956 818 A1 | 11/1999 |
| WO | WO 00/52866 A2 | 9/2000 |
| WO | WO 01/85699 A2 | 11/2001 |
| WO | WO 02/088932 A1 | 11/2002 |

\* cited by examiner

*Primary Examiner*—Michael G. Lee
*Assistant Examiner*—Jamara A. Franklin
(74) *Attorney, Agent, or Firm*—Ash Tankha of Counsel, Lipton, Weinberger & Husick

(57) ABSTRACT

A method and system that enables a customer to delegate or authorize another individual to perform a financial transaction is provided. This system uses a smart card and a biometric scanner or reader writer, or a biometric device without a smart card. The smart card holds personal and financial accounts information about the customer including a set of biometric templates of the customer. The second smart card owner is identified as the true owner of a smart card after the second smart card passes a biometric authentication using a read write device. The first smart card owner specifies the desired transaction that is to be performed by the second smart card. The delegated or authorized transaction created by the first smart card is encrypted and stored in the second smart card and/or to a remote back-end host server.

17 Claims, 11 Drawing Sheets

BIOMETRIC DELEGATION AND AUTHENTICATION OF FINANCIAL TRANSACTIONS

BACKGROUND OF THE INVENTION

This invention generally relates to a method and system for a person to securely and reliably delegate or authorize the execution of a financial transaction to another person, and for reliably verifying the identity of the person to whom the financial transaction has been delegated or authorized. For example, it relates to a commercial bank where a bank customer, i.e., a person who holds an account with the bank, delegates or authorizes another individual to perform one or more transactions against the customer's account.

The processes involved in banking transactions have improved significantly in the past several years due to automation and network communication. However, currently, there is no reliable and secure way for an individual to delegate or authorize another individual to perform a banking transaction. For example, at present, a bank customer cannot reliably and securely delegate or authorize another individual to cash a check, or withdraw funds from his or her bank account if the bank customer is unable to go to the bank. At present, to conduct the above transaction, the bank customer has to delegate or authorize another individual to perform the above transaction on his or her behalf; thereafter, the delegated individual has to counter-sign the check in the bank customer's branch for signature verification to complete the above transaction. However, the bank cannot guarantee that the bank customer actually signed the check before the check was given to the delegated or authorized individual, as the bank can only manually verify the bank customer's signature against an archived signature of the bank customer. This manual verification also cannot guard against the event where the bank customer's check was stolen and where the signature of the bank customer was thereafter forged on the stolen check.

Where the financial institution is a bank, and where the financial transaction is delegated or authorized by the bank customer to another individual, the bank may attempt to contact the bank customer via telephone to validate the transaction. In some instances, the bank may require that the individual authorized or delegated by the customer have an account with the bank to protect the financial institution in the event of fraud. In either case, it is almost impossible for the delegated or authorized individual to go to any branch of the financial institution other than the branch where the account was opened to conduct the transaction, if the delegated or authorized individual does not have an account with that financial institution. The above verification methods are unreliable, time-consuming and inherently subject to fraud.

In one conventional approach, the biometric data of the individual whose identity is to be authenticated is captured on a smart card. The smart card encrypts the biometric data and transmits it to a remote host server for authentication and authorization. The e-commerce transaction system comprises a wireless communication device for transmitting and receiving data and a contact-less smart card reader.

The above approach for biometric delegation and authorization of the bank customer does not provide a method or system for reliably verifying the identity of the delegated individual and for authorizing a transaction from one smart card to another smart card, and an adequate level of authentication and authorization. There is an unsatisfied need in the market for a secure financial transaction delegation or authorization process.

The present invention uses a smart card and biometric scanner or reader. The smart card may hold personal information regarding an individual, for example the individual's photo image, bank account information, etc., and the individual's biometric profile, for example, a set of fingerprint templates. Fingerprint templates are commonly used to authenticate the identity of the smart card holder. Only one individual can be authenticated as the owner of a smart card. For a banking delegation or authorization, or an authentication process, the bank customer writes the relevant information regarding a checking or savings account transaction to a remote backend host server and/or in the delegated individual's smart card, using a biometric scanner or reader controlled by a host application. If the delegated individual is not available to allow the delegated transaction to be written into the delegated individual's smart card using the biometric scanner or reader, the delegation or authorization transaction information is written by the bank customer to the back-end host server. The transaction information may consist of an amount, check number, delegated transaction expiration date, etc. The delegated or authorized individual can now transact the delegated transaction at any branch of the customer's bank; After verifying the delegated or authorized individual's identity, the bank personnel can reliably process the transaction. The information stored in the delegated or authorized individual's smart card is secure since only the bank customer can write the delegated or authorized transaction into the delegated or authorized individual's smart card. Furthermore, information stored in the smart card of the delegated or authorized individual is accessible only after a successful authentication of the owner of the smart card.

In another embodiment of this invention, only a biometric device is used to create the delegation or authorization records. In this scenario, the biometric device holds the device owner's biometric profile information with a unique biometric profile code which is used to access the device owner's personal and account information. Upon successful authentication of the biometric device owner, the associated biometric profile code is used to retrieve the device owner's account information for delegation or authorization. To process a delegation or authorization, the delegated or authorized person is authenticated using the delegated or authorized individual's biometric device, and the associated biometric profile code is used to retrieve the delegated or authorized transaction.

The delegation or authorization process, authentication of the delegated or authorized individual, and delegated transaction execution encompasses four major processes—enrollment, delegation or authorization, processing, and card recreation. This invention is directed to the above four processes.

DETAILED DESCRIPTION OF THE INVENTION

Figure 1:
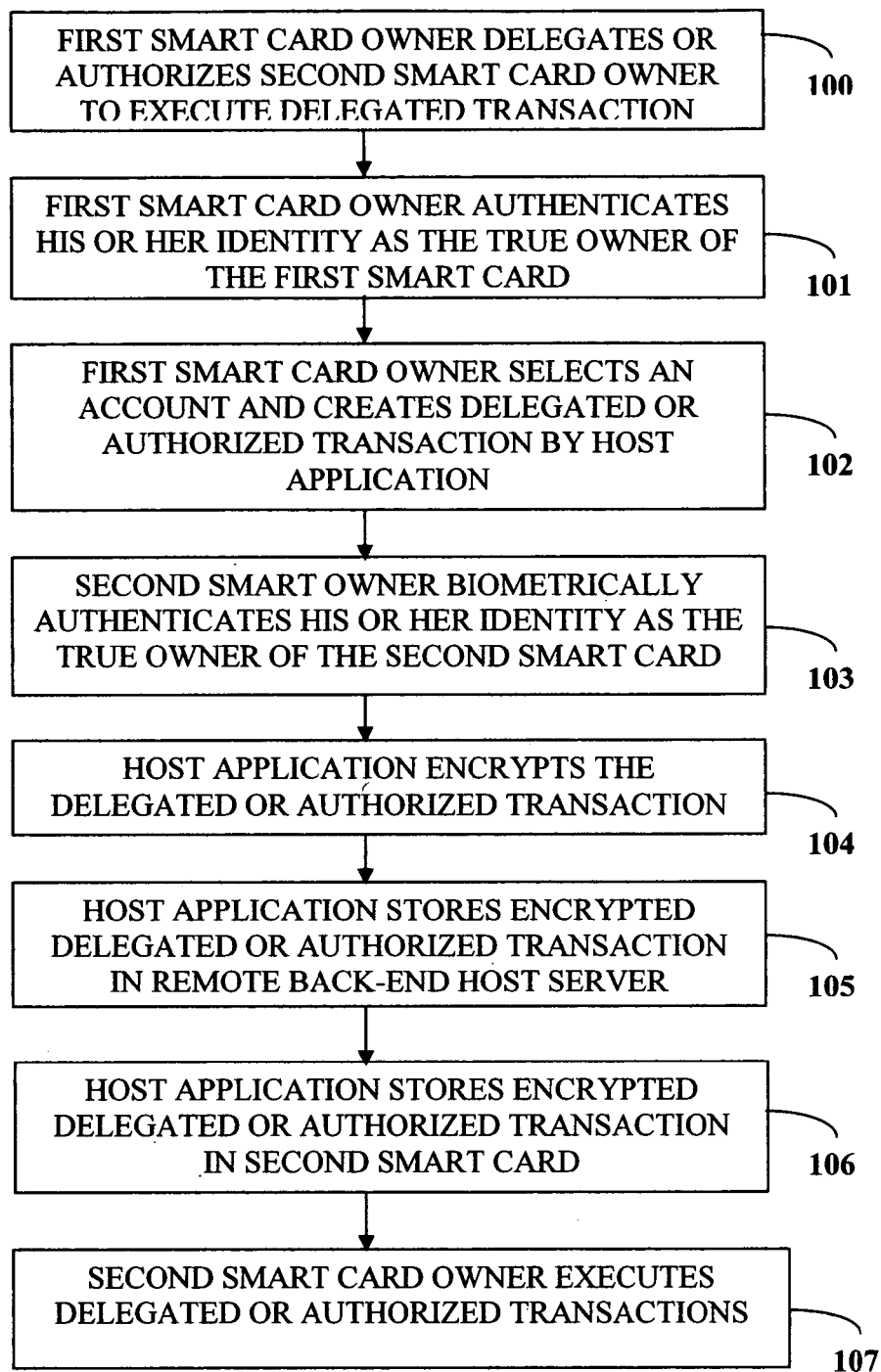
FIG. 1 illustrates a method for the first smart card owner to delegate or authorize the execution of a financial transaction to a second smart card owner.

In this application, the following definitions will be used:

The first smart card owner is the person that delegates or authorizes the execution of the financial transaction to the second smart card owner The second smart card owner is the person to whom the financial transaction is delegated or authorized for execution at the financial institution by the first card owner. For example, where the financial institution is a bank, the bank customer who delegates or authorizes a transaction to be executed against his or her account at the bank is the first smart card owner 203. The individual to whom the above financial transaction is delegated or authorized for execution against the bank customer's account is the second smart card owner 204.

A smart card owner, in general, may be any person that is enrolled in the financial transaction delegation or authorization system.

The delegated or authorized transaction is the financial transaction delegated or authorized by the first card owner to the second card owner.

The delegation or authorization process is the overall execution of the delegated or authorized transaction at a financial institution by the first smart card owner and/or the second smart card owner.

A delegated transaction is a transaction where a delagator gives another person the authority or proxy to execute the transaction on the delegator's behalf. An example of a delegated transaction is where a bank customer writes a check made out to cash, and delegates another person to cash the check on the bank customer's behalf.

An authorized transaction is a transaction where the authorizing person gives another person X the authority to execute a transaction for the benefit of person X against the authorizing person's financial account. An example of an authorized transaction is where a bank customer writes a check made out to another person, thereby authorizing that person to cash that check against the bank customer's account.

In the drawings, where the text in the logic reads "delegated", the transaction referred to may be a delegated transaction, or an authorized transaction.

The host application is a software program running in a computer system that provides the interface between the biometric devices and the back-end host server.

An access privilege is the level of access granted to an individual on the host application to execute an operation or command.

The biometric profile is a collection of one or more types of biometric attributes such as a person's fingerprints, iris, retina, facial contour, etc.

The biometric profile code is a unique value generated after a successful biometric authentication between the live biometric attribute of an individual and the stored biometric attribute of that individual.

A personnel of the financial institution is an employee of the financial institution that is authorized to login to the delegation or authorization process and use the host application.

Examples of financial institutions include banks, investment banks, security and brokerage firms, check cashing services, Western Union Co., etc. For example, this invention may be used by a stock owner to delegate or authorize the purchase or sale of stock to a stock broker against the portfolio of the stock owner.

Hereafter, the financial institution used to exemplify the delegation or authorization process will be a bank.

Figure 2A:
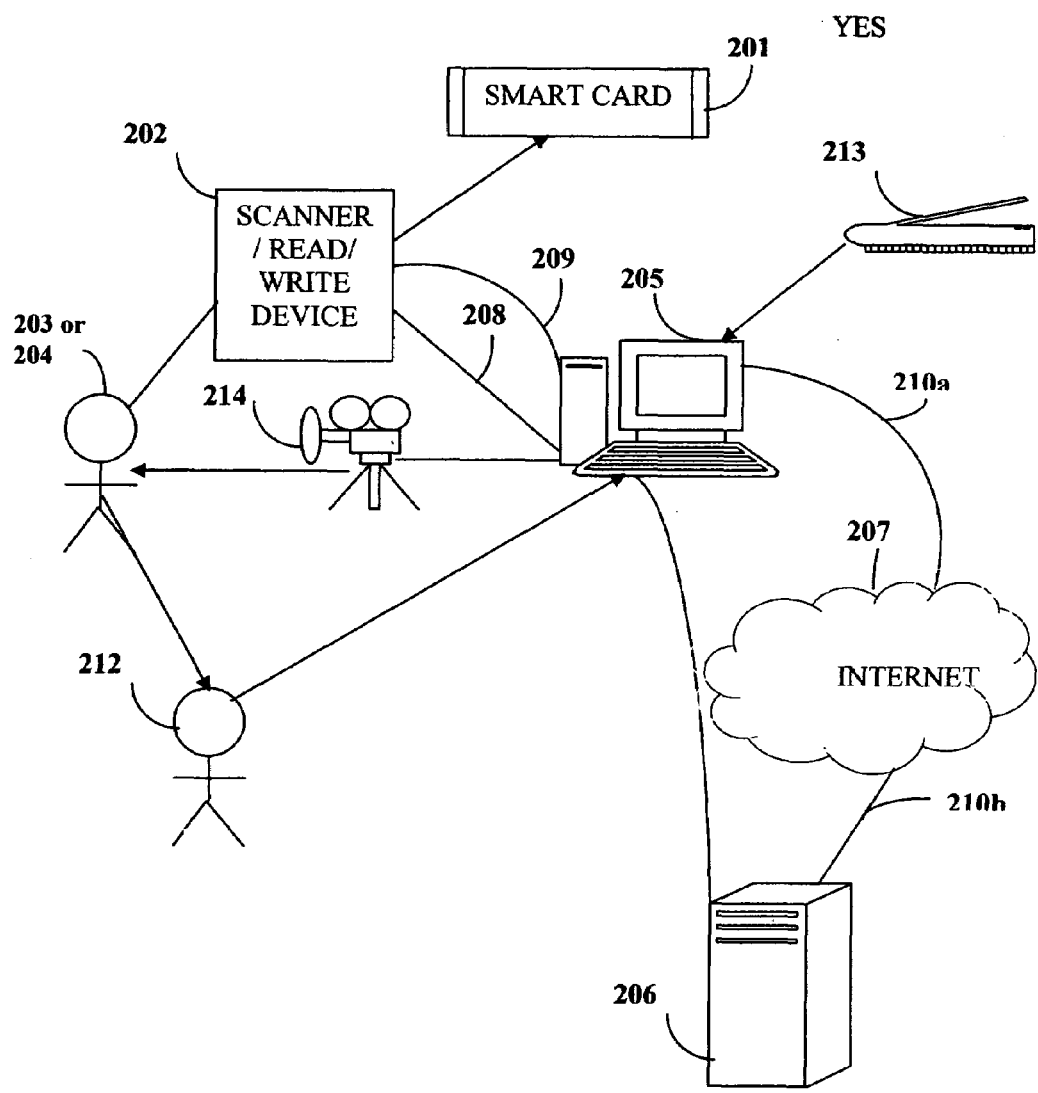
FIG. 2A is a block diagram of the enrollment process for the first smart card owner, or for the second smart card owner to obtain the first smart card, or the second smart card respectively that is used in this delegation or authorization system.

FIG. 1 and FIG. 2A illustrates the method for a first smart card owner 203 to delegate or authorize the execution of a financial transaction at a financial institution to a second smart card owner 204. The first smart card owner 203 delegates or authorizes a second smart card owner to execute the delegated or authorized transaction 100. The first card owner authenticates his or her identity as the true owner of the first smart card 101 at the bank. The first smart card owner 203 selects an account at the bank and creates the delegated or authorized transaction on the first smart card using the host application 102. The second smart card owner 204 then biometrically authenticates 103 his or her identity as the true owner of the smart card 201 using a read write device 202. The delegated transaction created by the first smart card owner 203 is encrypted 104 by the host application using propriety or open encryption algorithms and stored 105 in a remote back-end host server 206 and in the second smart card 106. Once the delegated or authorized transaction is completed, the second smart card owner executes the delegated or authorized transaction 107 at the bank. If the second smart card owner's smart card is not available during the delegation or authorization process, then the delegated or authorized transaction is written only to the back-end host server 206.

The enrollment process for a smart card owner involves the initial creation of a smart card for the first smart card owner. In order to process the first smart card owner's delegated or authorized transaction, the first smart card owner needs to go through a successful login authentication and access privileges verification. The first smart card owner's personal information, for example his or her picture image, and the first smart card owner's biometric profile, for example, his or her fingerprint templates are collected, encrypted and stored in the first smart card after successfully storing the information in a remote back-end host server 206.

Figure 2B:
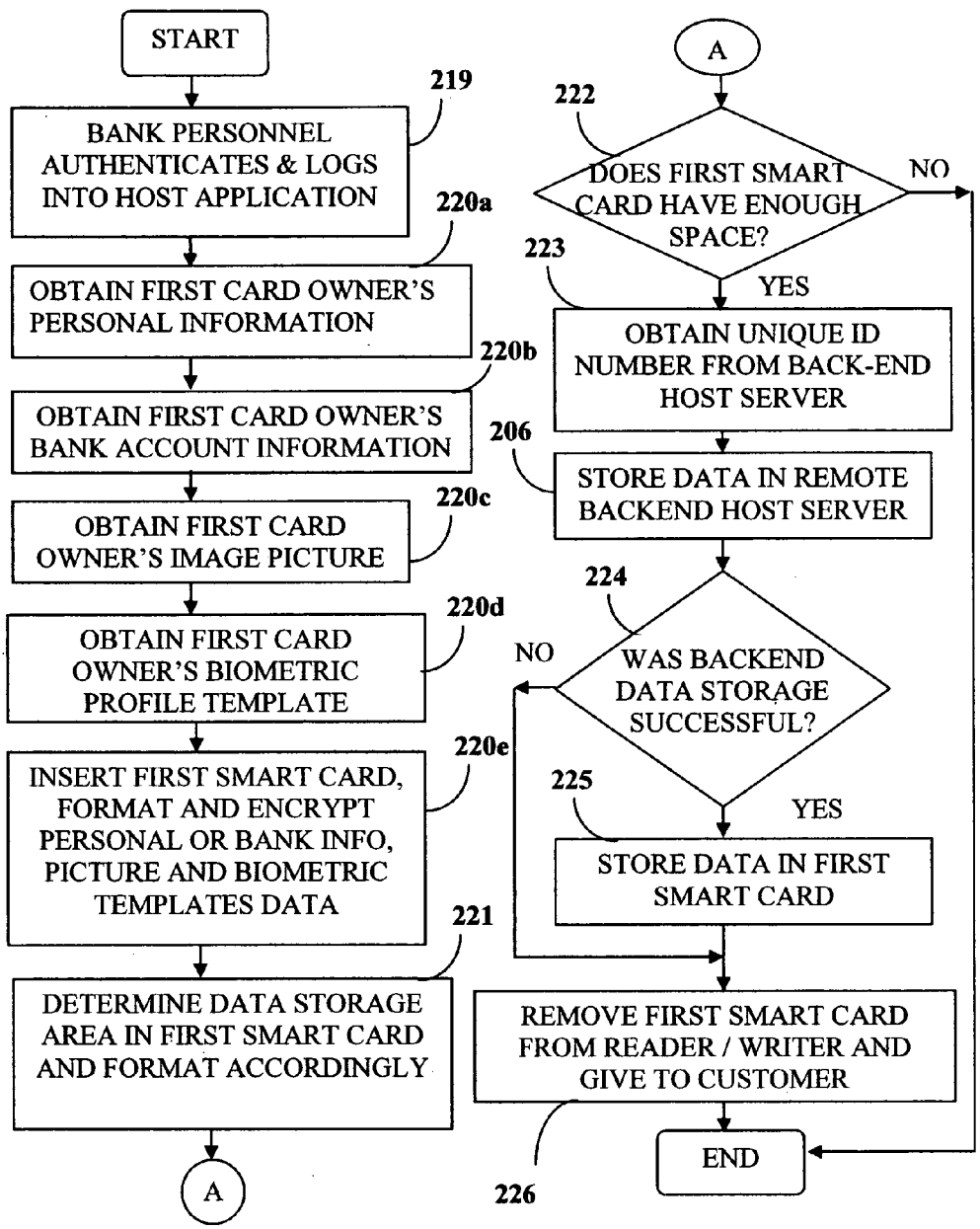
FIG. 2B is flow diagram of the enrollment process for the first smart card owner or the for the second smart card owner to obtain the first smart card or the second smart card respectively that is used in this system.

FIG. 2A and FIG. 2B illustrate the enrollment process of the first smart card owner 203 or the second smart card owner 204 at the bank. The bank personnel 212 authenticates his or her identity using a password that may be personal information or a biometric profile, for example, a fingerprint and then logs into the host application 219. The bank personnel 212 then obtains and enters the personal and account information of the first smart card owner or the second smart card owner (220a, 220b, 220c, 220d, 220e). The bank personnel 212 then obtains the identification from the first smart card owner or second smart card owner, such as the owner's 203 or 204 personal information and enters the personal information into an application in the personal computer 205. The personal computer 205 application can also extract personal information from an analysis of documents obtained via the scanning device 213. If the first smart card owner 203 or the second smart card owner 204 previously obtained a smart card 201 from another institution, then bank personnel 212 uses the smart card number or 203 or 204's last name and date of birth to retrieve the current personal information, biometric profile, for example the fingerprint templates, and photo image from the back-end host server 206. The bank personnel 212 either retrieves the smart card owner's 203 or 204 account information from the bank system, or obtains the information from the smart card holder 203 or 204 and validates the information through the bank system. This information can also be obtained via the application in the personal computer 205. The bank personnel 212 also either scans the smart card owners 203 or 204 photograph into the personal computer 205 application using a scanning device 213 or captures the smart card owners photograph through a camera 214 and stores it in the application in the personal computer 205. The smart card owner's 203 or 204 biometric profile, for example, his or her fingerprint templates are obtained using a fingerprint scanning device 202 attached to the personal computer 205 via a wired communication channel 208 or wireless communication channel 209 and thereafter stored in the application in the personal computer 205. The application in the personal computer 205 obtains one or more unique identification numbers from the back-end server 223 if sufficient data storage space 221 is available in first smart card 222 and subsequently formats the data and stores the data in the back-end host server 206 using wired communication channel 210a or wireless communication channel 210b. If the data storage in the back-end host server 206 was not successful 224, then the smart card 201 is removed 226 from scanner, or read or write device 202. If the data storage in the back-end host server 206 was successful 224, then the application in the personal computer 205 formats the data, and using the scanner or read or write device 202 stores the data 225 in smart card 201 via wired communication channel 208 or wireless communication channel 209. Smart card 201 may be either a single application smart card or a multi-application smart card. The personal computer 205 application displays one or more unique identification numbers associated with the smart card 201. The back-end host server 206 then systematically compares the biometric profile, for example the fingerprints of smart card owner 203 or 204 with each of the previously stored fingerprint. A match between the two sets of fingerprints indicates that smart card owner 203 or 204 is attempting to obtain multiple smart cards and the new smart card is then canceled. The read or write device 202 is either one device for acquiring the fingerprints and reading and writing to the smart card, or more than one device. If the smart card 201 inserted into the read or write device 202 is removed without the permission of the personal computer 205 application, the authorization or delegation process automatically terminates.

FIG. 3A, FIG. 3B, FIG. 3C and FIG. 3D illustrates the delegated or authorized transaction creation process. In order for the second smart card owner 204 to conduct a delegated or authorized transaction on behalf of the first smart card owner 203, the first smart card owner 203 first creates the delegated or authorized transaction records on the personal computer 205 application. The second step involves writing the delegated or authorized transaction on the remote back-end host server 206 and in the second smart card owner's 204 smart card. The third step involves the second smart card owner 204 authenticating and executing the delegated or authorized transactions in the bank using his or her smart card containing the delegated or authorized transaction.

FIG. 3A, FIG. 3B, FIG. 3C and FIG. 3D also illustrate the use of a host application in the personal computer 205 and the biometric scanner, or the read or write device 202 by the first smart card owner 203 to authenticate his or her identity.

The first step in the creation of the delegated or authorized transaction by the first smart card owner 203 on his or her personal computer 205 application. The first smart card owner inserts 300 his or her smart card into the scanner or read or write device for authentication 301. On successful authentication 302 of the first smart card owner 203, the host application on the personal computer 205 application reads the first smart card owner's 203 account information 316 from the smart card 201 using the scanner or read or write device 202. If one or more accounts are identified 303, the host application displays 304 the first smart card owner's 203 open bank accounts information. The first smart card owner 203 selects the applicable bank account 305 and enters the delegated or authorized transaction information 307 in the form 306 displayed by the host application. Before the delegated or authorized transaction information is written in the second smart card, the host application on the personal computer 205 requests that the second smart card owner 204 be authenticated 308 via the scanner or read or write device 202 and checked for successful authentication 309. If the second smart card owner is authenticated, the host application thereafter encrypts the delegated or authorized transaction 310 and determines storage area and formats the second smart card 311. To complete the delegation or authorization process, the host application requests that the first smart card owner 203 be re-authenticated 312. On successful re-authentication 313 of the first smart card owner 203, the delegated or authorized transaction information is stored 314 in the back-end host server 206 via wired communication channel 210a, or wireless communication channel 210b using an internet service 207 and in the second smart card 204 using the scanner or read or write device 202 attached to the personal computer 205 either through wired communication channel 208, or wireless communication channel 209 by the host application. The second smart card with the delegated or authorized transaction is removed from the scanner or read or write device and is available for execution of the delegated or authorized transaction at the bank. The first smart card 203 is either a single application smart card or a multi-application smart card. The scanner or read or write device 202 is either one device for acquiring a biometric profile, for example the fingerprint, and smart card updates, or more than one device for reading or writing into the smart card. Removal of the first smart card 203 or the second smart card 204 after the smart card has been inserted into the scanner or read or write device 202 without the permission of the personal computer 205 application automatically terminates the delegation or authorization process.

Figure 3A:
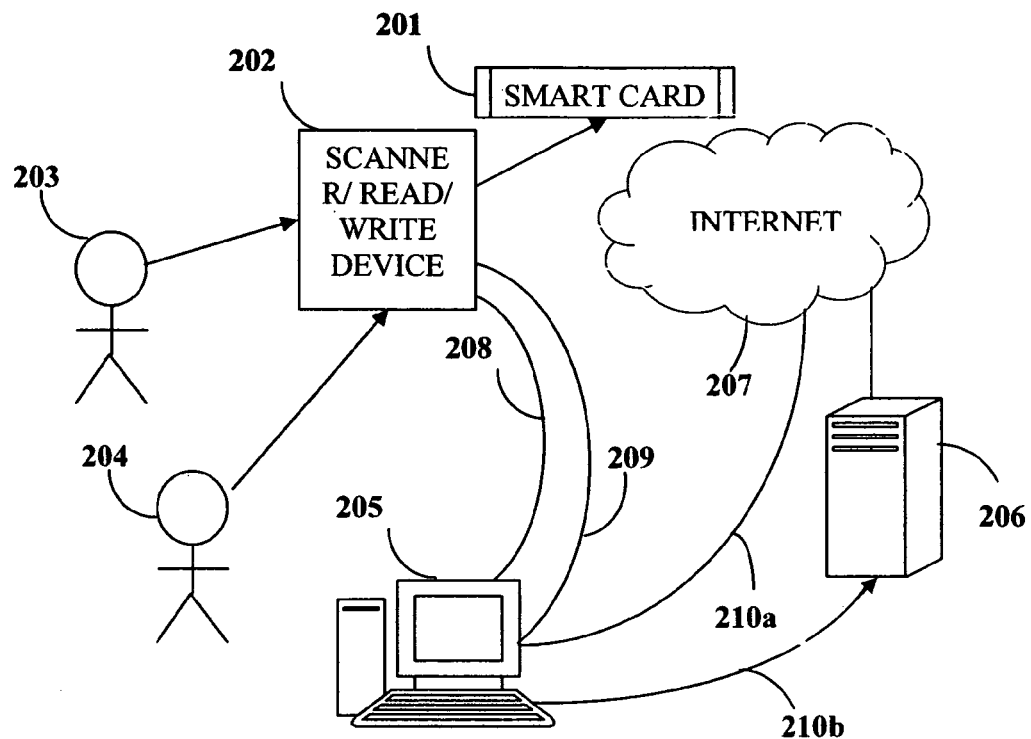
FIG. 3A is a schematic diagram of the creation of the delegated or authorized transaction from the first card owner to the second card owner where the remote back-end server is accessible over network communication.
Figure 3B:
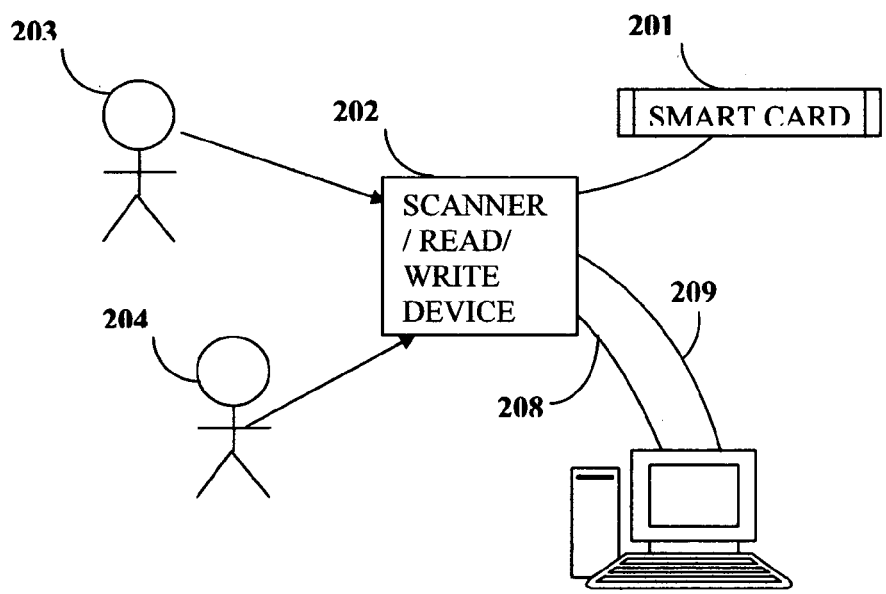
FIG. 3B is a schematic diagram of the creation of the delegated or authorized transaction from the first card owner to the second card owner when the remote back-end server is not accessible over a network communication.
Figure 3C:
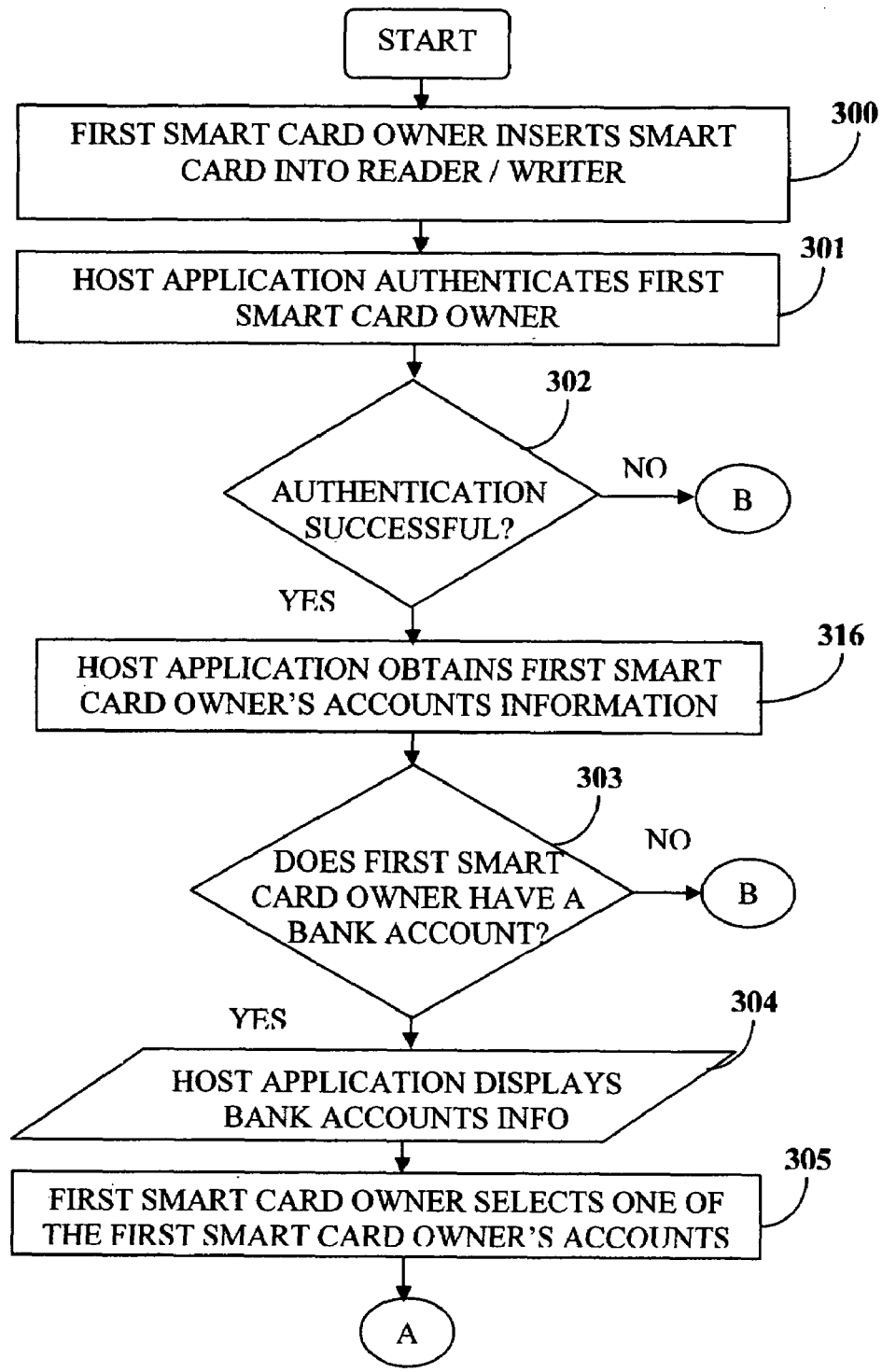
FIG. 3C and FIG. 3D shows a flow diagram of the creation of the delegated or authorized transaction by first smart card owner to second smart card owner.
Figure 3D:
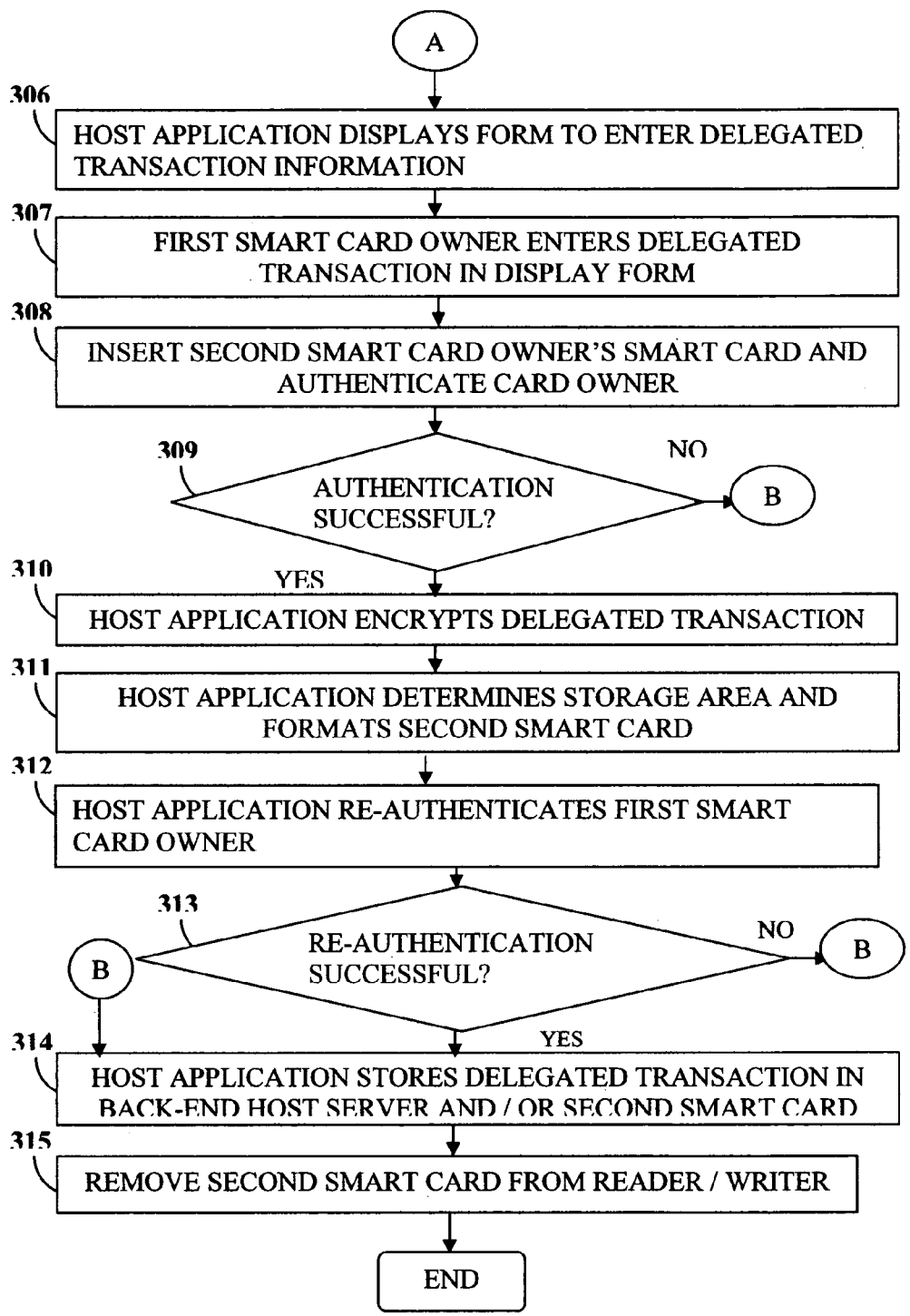

Another embodiment of delegation or authorization creation is illustrated in FIGS. 3B, 3C and 3D where there is no network infrastructure to communicate with the back-end host server 206. Here, the first smart card owner 203 inserts his or her smart card into reader or writer device 300 and authenticates 301 his or her identity using the host application in the personal computer 205 and the scanner, or read or write device 202. On successful authentication 302, the personal computer 205 application using the scanner or read or write device 202, reads the first smart card 203 account information 316 from the smart card 201. If one or more accounts are identified, 303 the host application displays the first smart card owner's 203 available accounts. The first smart card owner 203 selects the applicable account 305 and enters the delegated or authorized transaction information 307 in the display form 306. Before the delegated or authorized transaction information is stored in the second smart card 204, the host application on the personal computer 205 requests that the second smart card owner 204 is authenticated 308 via the scanner or read or write device 202. To complete the process, the host application requests that the first smart card owner 203 be re-authenticated 312. On successful re-authentication 313, the delegated or authorized transaction information is stored 314 in the smart card 201 using the scanner or read or write device 202 attached to the personal computer 205 either through wired communication channel 208 or wireless communication channel 209 and the second smart card containing the delegated or authorized transaction is removed 315 from the read or write device 202. The smart card 201 is either a single application smart card or multi-application smart card. The scanner or read or write device 202 is either one device for acquiring the fingerprints and reading or writing the smart card or more than one device. Removal of the smart card 201 after it has been inserted into the scanner or read or write device 202 without the permission of the personal computer 205 application automatically terminates the delegation or authorization process.

Figure 4A:
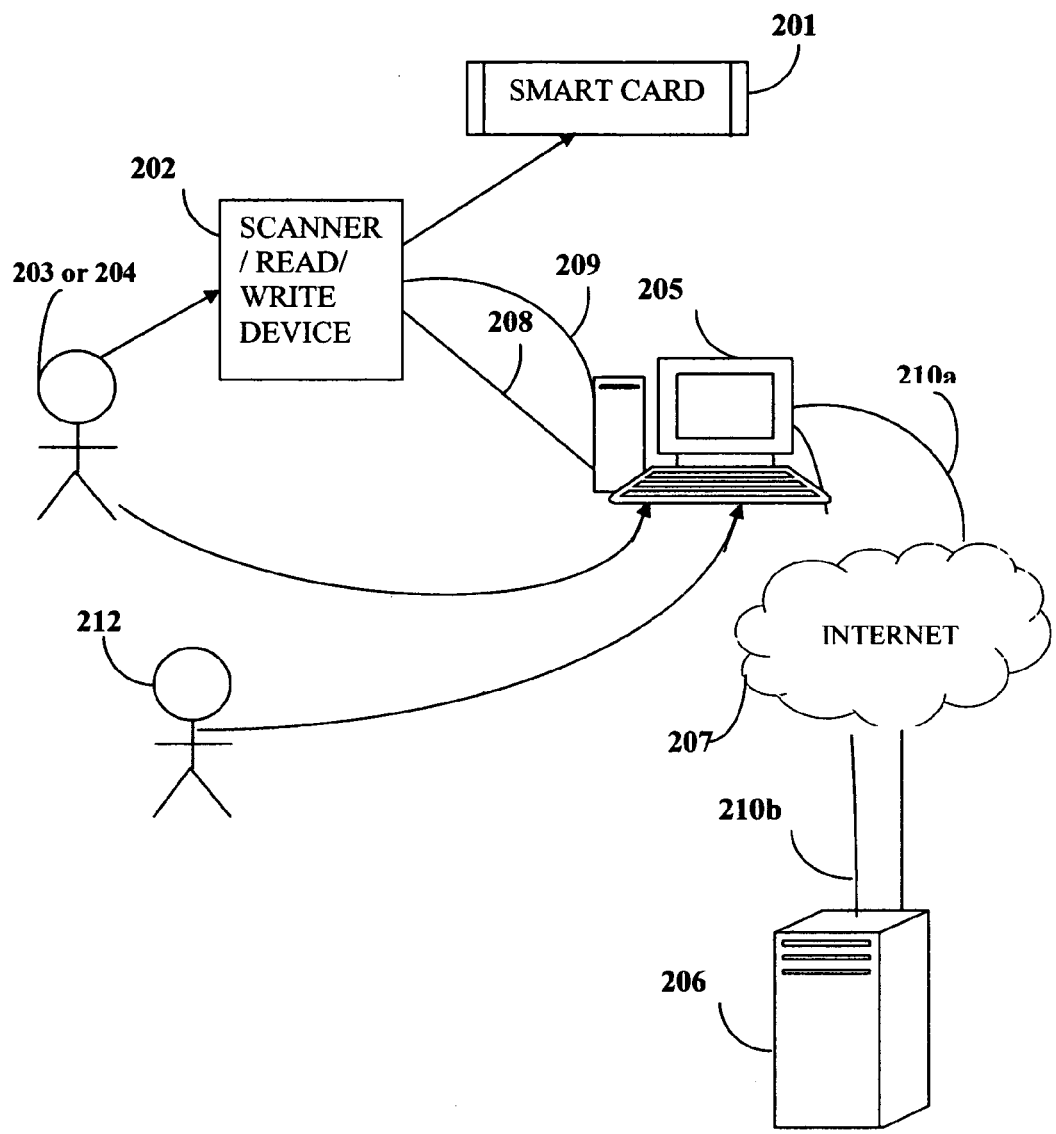
FIG. 4A is a schematic diagram of the retrieval process of the delegated or authorized transaction at the financial institution, conducted by an authorized person from the financial institution when the second smart card owner's smart card is not available.
Figure 4B:
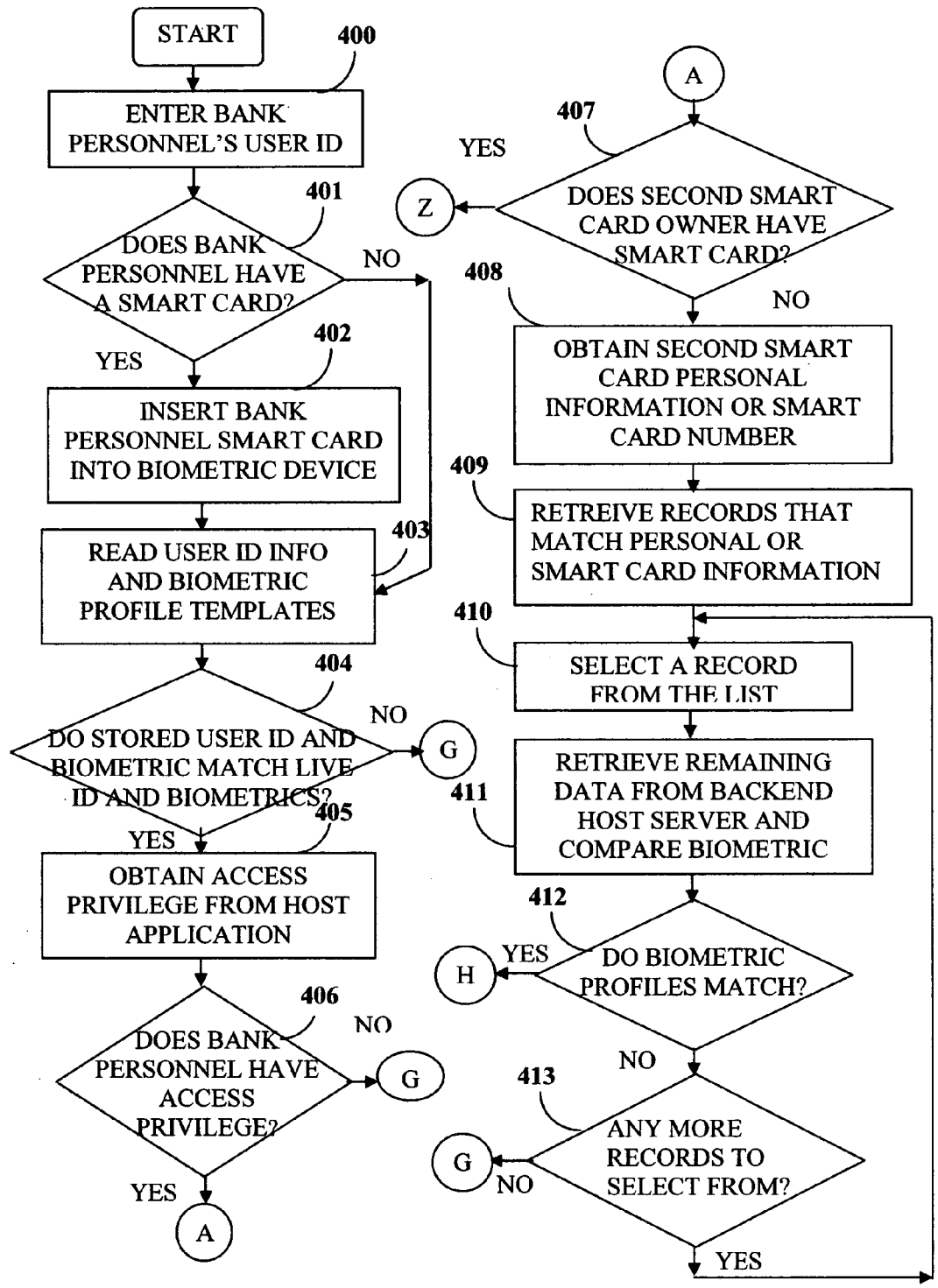
FIG. 4B is a flow diagram of the retrieval process of the delegated or authorized transaction at the financial institution conducted by an authorized person from the financial institution when the second smart card owner's smart card is not available.

FIG. 4A and FIG. 4B illustrate the retrieval process of the delegated or authorized transaction at the bank by an authorized personnel of the bank when the second smart card owner's smart card is not available, for example where the smart card is lost or misplaced. As illustrated in FIG. 4A and FIG. 4B, the bank personnel 212 logs into the host application using a password or personal user identification 400 of his or her biometric profile, for example the fingerprint via scanner or read or write device 202. On successfully logging into the system, the bank personnel 212 who is authorized to use 401 a smart card 201, inserts 402 his or her smart card into the scanner or read or write device 202 for authentication. The stored fingerprint template of the bank personnel 212 is read 403 from the smart card 201 via the scanner or read or write device 202 by the host application. The scanner or read or write device 202 then obtains the live fingerprint from the bank personnel 212. If the above two sets of fingerprint templates match 404 and the user login identification match, the host application on the personal computer 205 allows the bank personnel 212 to login. The ability of the bank personnel 212 to proceed with the process is controlled by access privileges 405 from the host application whereby the bank personnel 212 must have the applicable access level 406 to continue. If the bank personnel 212 authentication is successful but the smart card owner's 203 or 204 smart card 201 is not available, then the bank personnel 212 obtains the second smart card owner's 204 smart card number or personal identification or password, for example, the second smart card owner's last name and date of birth 408 and enters it into the personal computer 205 application. The personal computer 205 application then retrieves 409 all records that match the second smart card number or last name and date of birth from the back-end host server 206 via wired communication channel 210*a*, or wireless communication channel 210*b* using the internet service 207. The bank personnel 212 then selects, one of the retrieved records 410, and the personal computer 205 application retrieves the remaining 411 information including the stored biometric profile, for example, fingerprints from the back-end host server 206 via the internet 207 and stores it in the personal computer memory. The personal computer 205 application uses the scanner, or read or write device 202 to obtain live biometric profile, for example the fingerprint of the second smart card owner and matches it with retrieved one. If the above two sets of fingerprint match 412 is successful, then the personal computer 205 displays the personal and account information. If the biometric profile of the second smart card owner does not match, the remaining records 413 from the retrieved records may be checked.

Figure 4C:
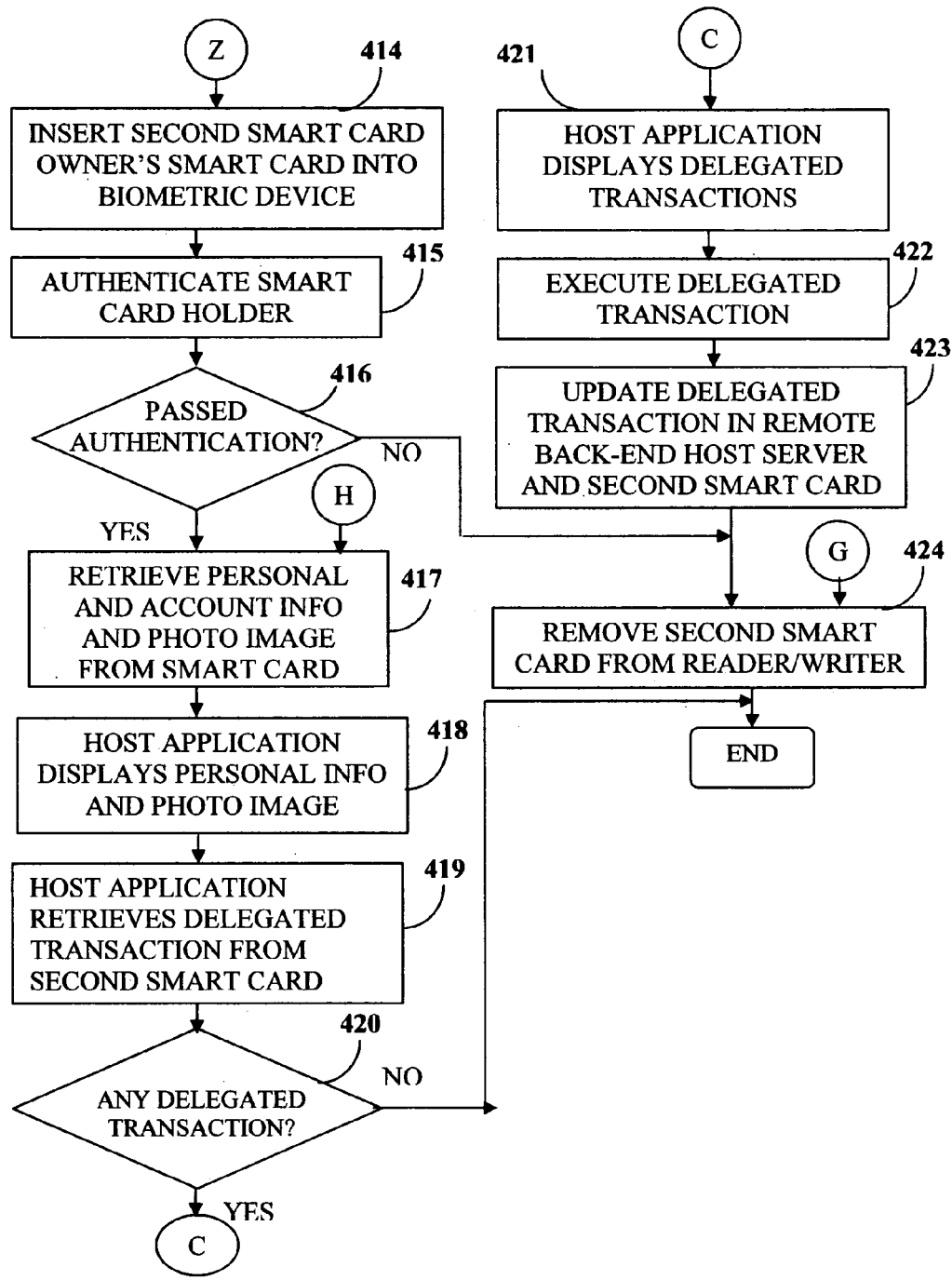
FIG. 4C is a flow diagram of the execution of the delegated or authorized transaction by the second smart card holder at the financial institution.

FIG. 4C illustrates the execution of the delegated or authorized transaction by the second smart card owner 204 at the bank. The second smart card owner 204 inserts 414 the smart card 201 into the scanner or read or write device 202 and authenticates himself 415. On successful authentication 416, the second smart card owner's 204 personal and account information and photo image are retrieved from his or her smart card by the personal computer 205 application 417 and displayed 418. The bank personnel 212 retrieves via the host application the delegated or authorized transaction 419 from the smart card 201 using the scanner or read or write device 202 and stores it in the local computer memory. The search criteria for the delegated or authorized transactions will restrict it to only accounts belonging to the current banking institution. If one or more delegated or authorized transactions are found 420, the host application displays the delegated transactions 421. The bank personnel 212 then executes the applicable transaction 422 from the records. The legacy banking application for processing the transaction can be independently initiated or initiated via the host application in the personal computer 205. The bank personnel 212 then updates the delegated or authorized transaction information 423 in the remote back-end host server 206 and second smart card 204 using the scanner or read or write device 202 either through wired communication channel 210*a* or wireless communication channel 210*b* and to the backend host server 206 using the internet service 207 to reflect that a particular transaction has been carried out. After execution of the delegated or authorized transactions, the bank personnel removes 424 the smart card 201 from scanner or read or write device 202. The scanner or read or write device 202 is either one device for acquiring the fingerprints and reading or writing the smart card or two separate devices. Removal of the smart card 201 after it has been inserted into the scanner or read or write device 202, without the permission of the personal computer 205 application, automatically terminates the process.

The smart card recreation process is the computerized process whereby the information stored on the first smart card 203 or the second smart card 204 if lost or destroyed can be recreated. The smart card owner's 203 or 204 personal information, for example a smart card number, last name and date of birth, or a feature of the biometric profile of the smart card owner 203 or 204 may be used to retrieve the information stored in the remote backend host server, and subsequently written into a new smart card. The bank personnel performing this smart card recreation activity will also need to be authorized to conduct this activity and authenticated prior to the start of the recreation process.

Figure 5A:
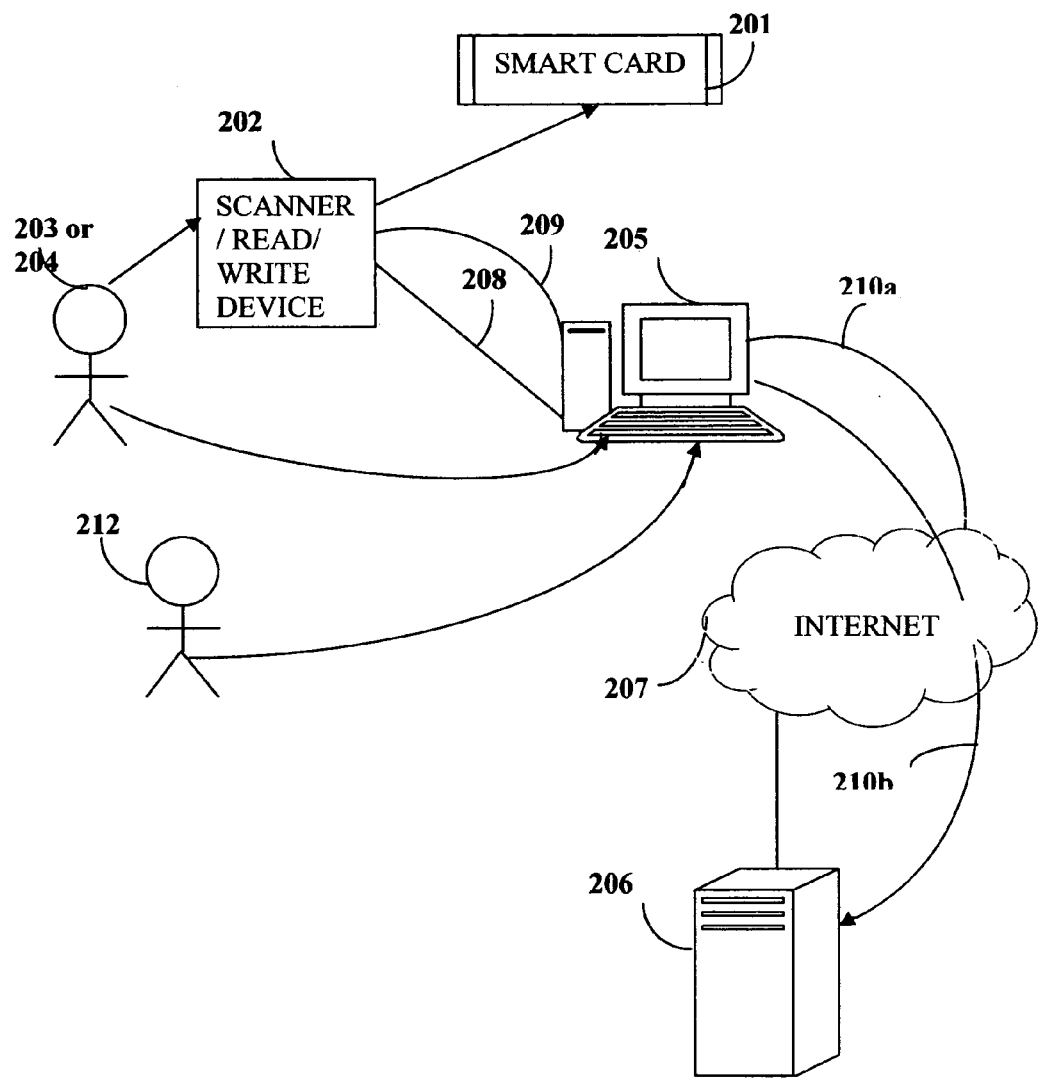
FIG. 5A is a schematic diagram of the recreation of the delegated or authorized transaction in the first smart card or the second smart card by an authorized personnel of the bank where the delegated or authorized transaction is to be conducted.
Figure 5B:
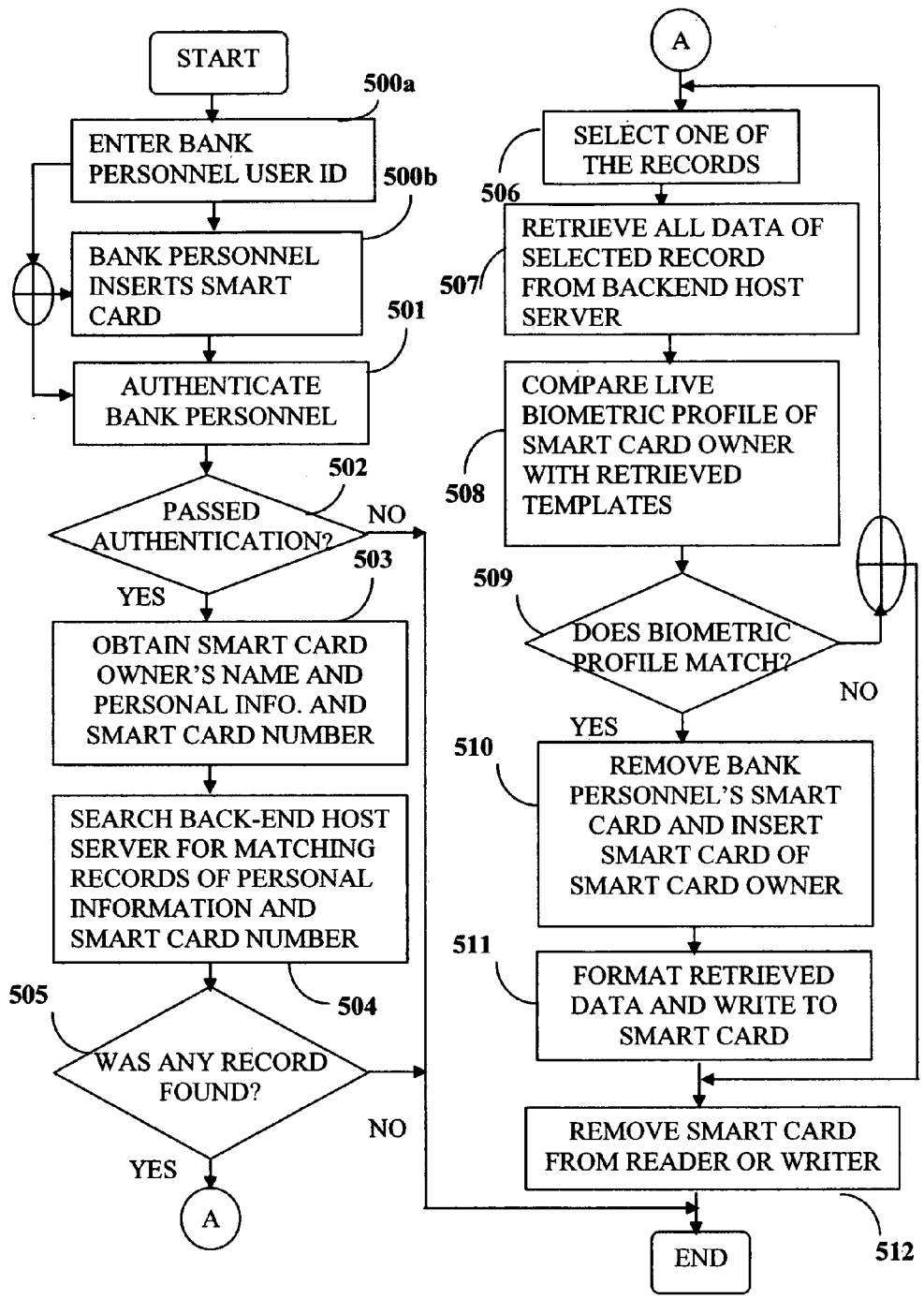
FIG. 5B is a flow diagram of the recreation of the delegated or authorized transaction in the first smart card or the second smart card by an authorized personnel of the bank where the delegated or authorized transaction is to be conducted.

FIG. 5A and FIG. 5B illustrate the recreation of the delegated or authorized transaction in the first smart card or the second smart card by an authorized personnel of the bank where the delegated or authorized transaction is to be conducted. As illustrated in FIG. 5A and FIG. 5B, the bank personnel 212 logs into the host application using a password of his or her biometric profile such as the fingerprint via the scanner or read or write device 202. The bank personnel first enters his or her user login identification 500a and then inserts 500b his or her smart card 201 into the scanner or read or write device 202 and authenticates himself or herself 501. If the bank personnel's 212 smart card is not available, the bank personnel enters only his/her user login identification. The ability of the bank personnel 212 to proceed with the process may be controlled by access privileges whereby the bank personnel 212 must have the applicable access privelege to continue. If the bank personnel 212 authentication is successful 502, then the bank personnel 212 obtains the smart card number or personal information, for example, the last name and date of birth 503 from the smart card owner 203 or 204 and enters the data into the personal computer 205 application. The personal computer 205 application then retrieves 504 all records that match the smart card number or last name and date of birth from the back-end host server 206 either through wired communication channel 210a or wireless communication channel 210b using the internet service 207. If any records are found 505, the bank personnel 212 then selects one 506 of the retrieved records, and the personal computer 205 application retrieves the remaining information 507 including the biometric profile, for example, stored fingerprints from the back-end host server 206 via the internet 207 and stores it in the local memory. The personal computer 205 application uses the scanner or read or write device 202 to obtain live biometric profile data, for example, the fingerprint and matches it with the retrieved record 508. On successful matching 509 of the fingerprints, the bank personnel 212 removes 510 his or her smart card 201 and inserts the smart card owner's 203 or 204 smart card 201. The personal computer 205 application uses wired communication channel 210a or wireless communication channel 210b to write 511 all relevant information into the smart card 201 via the scanner or read or write device 202. Once the data is stored in the smart card 201, the smart card 201 is removed 512 from the scanner or read or write device 202. The scanner or read or write device 202 is either one device for acquiring the fingerprints and reading or writing the smart card or more than one separate devices. Removal of the smart card 201 after it has been inserted into the scanner or read or write device 202 without the permission of the host application in PC 205 automatically terminates the process.

The following example describes the method of enrollment of a smart card customer. Assume that Mr. John Doe who has both checking and savings accounts with Anywhere Trust Bank, 20 Anystreet Ave., Anytown, USA desires to delegate or authorize transactions to Ms. Mary Doe who does not have a bank account. First, Mr. and Ms. Doe need to enroll in the delegation and authorization system. To enroll, Mr. and Ms. Doe go to Anywhere Trust Bank, 20 Anystreet Ave., Anytown, USA. At the bank, they request Mr. James Openaccount, the bank's new account manager to enroll them in the delegation and authorization system. As a matter of protocol, Mr. Openaccount verifies that neither Mr. Doe nor Ms. Doe have been previously enrolled in the above system by another bank. Mr. Openaccount then starts the host application and authenticates himself with his login identification and his biometric profile, for example his fingerprint. Upon successful login, Mr. Openaccount first enrolls Mr. Doe by entering Mr. Doe's personal information, for example Mr. Doe's full name, address, phone number, e-mail address, and date of birth in the display form provided by the host application. He further requests and obtains biometric profile data of Mr. Doe, for example, fingerprint templates from any three fingers. Also, Mr. Openaccount either scans Mr. Doe's image picture from one of his identification cards or takes a live image picture with a camera, stores the image in the host application, and subsequently uploads the above information to the host application. Since Mr. Doe has accounts with Anywhere Trust Bank, Mr. Openaccount also enters and saves the checking and savings account information to the back-end host server. The back-end host server first generates a unique identification for Mr. Doe and then saves the information. The host application then stores the information in a smart card. Mr. Doe's full name and the generated identification are printed on the smart card. Mr. Openaccount then gives the smart card to Mr. Doe. Mr. Doe is now enrolled in the delegation and authorization system. Mr. Openaccount then goes through the same process to enroll Ms. Doe in the system.

A variation of this example is when a biometric device in communication with the host system is used instead of a smart card. The biometric device holds the biometric profile, for example, the fingerprint templates of the device owner and generates a biometric profile code when the live fingerprint templates match the stored fingerprint templates. To enroll in this scenario, bank personnel Mr. Openaccount performs the same enrollment activities as above, except that instead of obtaining Mr. Doe's fingerprints, Mr. Doe's biometric device is attached to Mr. Openaccount's computer and Mr. Doe's biometric profile code is retrieved by the host application from the biometric device, and used instead of a smart card number to store Mr. Doe's data at the back-end host server.

The following example describes the execution of a delegated or authorized transaction from the first smart card owner to a second smart card owner. Mr. Doe desires to withdraw $500.00 from his savings account, but is not able to drive to his bank due to ill-health. So, Mr. Doe delegates the withdrawal of the above money to Ms. Doe who is also enrolled in this system. Mr. Doe starts the host application on his computer, inserts his smart card and provides his fingerprint to authenticate that he is the owner of the smart card. Following the successful authentication, a form is displayed showing his savings and checking accounts. Mr. Doe selects the savings account and asks the host application to create a delegation transaction. A display form with the savings account number is provided to allow Mr. Doe to enter the transaction amount and the expiration date of this delegation. Mr. Doe then enters $500.00 for the amount to be withdrawn and 2 days later as the expiration date of the delegated traction. Mr. Doe then saves the delegated transaction on the host application. The host application then requests Mr. Doe to insert the smart card of the person to whom the transaction is being delegated to, i.e., the second smart card owner, into the smart card reader. Mr. Doe inserts Ms. Doe's smart card into the smart card reader. The host application then requests the owner of the second smart card to provide his/her fingerprint to authenticate that he/she is the true owner of the smart card. Ms. Doe then provides her fingerprint. The host application authenticates Ms. Doe as the owner of the second smart card, formats and encrypts the delegated transaction, and requests that Mr. Doe re-authenticate himself. Upon successful re-authentication of Mr. Doe, the host application stores the delegated transaction to the back-end host server and then also stores it in Ms. Doe's smart card. Mr. Doe removes Ms. Doe's smart card from the smart card reader and gives the second smart card to Ms. Doe to allow her to execute the delegated transaction at the bank.

Alternatively, Ms. Doe may enroll in the system with only a biometric device and without a smart card. After the delegated transaction is created, Ms. Doe's biometric device is attached to the host system and she is authenticated as the owner of the biometric device. The resultant biometric profile code allows the delegated transaction to be stored on the back-end host server by the host application.

The following example describes the execution of the delegated transaction by the second smart card owner. Shortly after Mr. Doe completes the delegated transaction for the withdrawal of $500.00 to Ms. Doe from his savings account, Ms. Doe goes for grocery shopping to her favorite shopping center, You Save, located at 154 George Avenue, Anytown, USA. When she finishes shopping, she decides to execute the delegated transaction. Mr. Doe's bank branch, Anywhere Trust Bank, 20 Anystreet Ave., Anytown, USA is approximately 7 miles from the shopping center, You Save. However, another branch of Anywhere Trust Bank is located approximately 2 miles from the shopping center. So Ms. Doe decides to go to the closer bank branch instead of the bank branch where her husband opened the savings account. Upon arrival at the branch bank, Ms. Doe requests Ms. Doit, the bank personnel who is logged into the host application that she would like to withdraw some money for her husband from his savings account and gives her smart card to Ms. Doit. Ms. Doit then inserts Ms. Doe's smart card into the smart card reader and requests Ms. Doe to provide her fingerprint to verify that she is the true owner of the smart card. Ms. Doe provides her fingerprint which are matched against the fingerprint templates in the smart card. Upon successful authentication, the host application reads and displays the personal and account information in the smart card including the image picture of the smart card owner. Ms. Doit then requests the host application to read and display the delegated transactions for the card owner. The host application displays a form with a table showing Mr. Doe's name, savings account number, $500.00 amount to be withdrawn, expiration date of delegated transaction and transaction code. Ms. Doit then withdraws $500.00 from Mr. Doe's savings account, records the transaction code with the withdrawal amount, requests the host application to indicate that the delegated transaction has been processed, and gives the $500 to Ms. Doe.

Alternatively, if Mrs. Doe enrolled in the system with only a biometric device without a smart card, then Ms. Doit would attach the biometric device to the host system, authenticate that Ms. Doe is the owner of the biometric device by the host application, and the resultant biometric profile code is used to retrieve Ms. Doe's personal and account information, image picture and delegated transactions. Then the remaining delegated transaction processing will proceed as above.

The following example describes the method of recreating a smart card that is lost or unavailable. While on a vacation trip in Orlando, Fla., Ms. Doe who is enrolled in the delegation and authorization system loses her smart card. She finds that Sunshine Bank in Orlando uses this delegation and authorization system, so she goes to a branch of Sunshine Bank in Orlando to have her smart card recreated. At the bank, Ms. Doe was directed to Ms. Janet Gator, new account manager. Upon being informed of Ms. Doe request, Ms. Gator authenticates herself and logs into the host application in the personal computer at her office. As Ms. Doe had lost her smart card and also did not remember her smart card number, Ms. Gator uses Ms. Doe's personal information, for example, her last name and date of birth to retrieve matching records from the back-end host server. Then using Ms. Doe's address, Ms. Gator selects Ms. Doe's records. Ms. Gator then asked Ms. Doe to provide the fingerprint of one of the fingers that she used during enrollment in the system. The host application then uses the fingerprint device to compare Ms. Doe's live fingerprint with those associated with the selected record. When the fingerprints match, the host application uploads the remaining information, for example, all personal and account information, fingerprint templates, image picture, and unprocessed delegations from the back-end host server and stores them in a new smart card that Ms. Gator inserted into the smart card reader/writer. When the host application completes storing the data, Ms. Gator removes the smart card from the smart card reader/writer, prints Ms. Doe's full name and smart card number on the smart card and gives the recreated smart card to Mrs. Doe.

What is claimed is:

1. A method for a first smart card owner to delegate or authorize the execution of a financial transaction to a second smart card owner at a financial institution, the delegation or authorization process comprising the steps of:
   authenticating the first smart card owner as the true owner of the first smart card; creating a delegated or authorized transaction on the first smart card owner's account, wherein the delegated or authorized transaction is the financial transaction delegated or authorized by the first card owner to the second card owner and wherein a delegated transaction comprises a first card owner giving a second card owner the authority or proxy to execute the transaction on the first card owner's behalf;
   authenticating biometrically the second smart card owner as the true owner of the second smart card;
   encrypting the delegated or authorized transaction of the first smart card owner;
   storing the encrypted delegated or authorized transaction in a remote back-end host server; storing the encrypted delegated or authorized transaction in the second smart card; and,
   executing the delegated or authorized transaction stored in the second smart card or the remote back-end host server by an authorized personnel of the financial institution.

2. The method of claim 1, wherein the first smart card owner's biometric profile or personal information stored in the first smart card is collected and stored in the first smart card owner's account at the financial institution by an authorized personnel of the financial institution.

3. The method of claim 2, wherein said authorized personnel's access to a delegated or authorized transaction, or access for editing said first smart card owner's personal or account information is required to be verified via authentication by a biometric device.

4. The method of claim 1, wherein the a biometric feature of the first smart card owner is obtained live from the first smart card owner or retrieved from an existing database.

5. The method of claim 4, wherein the existing database is located remotely and external to the first smart card.

6. The method of claim 5, wherein the delegated or authorized transaction is retrieved via wired or wireless communication if the database is located remotely and external to the first smart card.

7. The method of claim 1, wherein the delegated or authorized transaction is stored in a single application smart card or in a multi-application smart card and the single application smart or multi-application smart card either needs formatting or the use of a predefined format structure.

8. The method of claim 1, wherein one or more unique identification numbers are generated in the first smart card of the first smart card owner.

9. The method of claim 1, wherein the delegated or authorized transaction is encrypted and stored in the first smart card after successfully storing the delegated or authorized transaction in the remote back-end host server.

10. The method of claim 1, wherein the functionalities of scanning biometric profiles, comparing biometric profiles and smart card operations are integrated in a single device.

11. The method of claim 1, wherein the functionalities of scanning biometric profiles, comparing biometric profiles and smart card operations are performed by one or more devices.

12. The method of claim 1, wherein delegated or authorized transaction entered on the second smart card is accessible only on successful authentication of the second smart card owner as the true owner of the smart card.

13. The method of claim 1, wherein the delegated or authorized transaction at a financial institution is performed only if the first smart card owner has an account in the financial institution in which the transaction is to be performed.

14. The method of claim 1, wherein the delegated or authorized transaction process terminates if one of the smart cards is removed before a application on the personal computer permits the removal of the one of the smart card.

15. The method of claim 1, wherein the first smart card owner and second smart card owner each authenticate an identity before the delegated or authorized transactions are written into the second smart card.

16. The method of claim 1, wherein the stored delegated or authorized transactions are encrypted using proprietary or open encryption algorithm.

17. The method of claim 1, wherein the delegated or authorized transaction is stored in the smart card after a successful store in the remote back-end host server.

* * * * *